(12) United States Patent
Ono

(10) Patent No.: US 7,293,187 B2
(45) Date of Patent: Nov. 6, 2007

(54) IMAGE SENSING APPARATUS AND POWER MANAGING METHOD

(75) Inventor: Yasumasa Ono, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 403 days.

(21) Appl. No.: 10/927,849

(22) Filed: Aug. 27, 2004

(65) Prior Publication Data

US 2005/0050371 A1    Mar. 3, 2005

(30) Foreign Application Priority Data

Aug. 27, 2003    (JP)    ............... 2003-303544

(51) Int. Cl.
 G06F 1/26    (2006.01)
 G06F 1/28    (2006.01)
(52) U.S. Cl. ............ 713/324; 713/300; 713/310; 713/320; 713/321; 713/322; 713/323; 713/330; 713/340
(58) Field of Classification Search .......... 713/300, 713/310, 320–324, 330, 340
See application file for complete search history.

(56) References Cited

U.S. PATENT DOCUMENTS

| 6,031,964 | A | 2/2000 | Anderson |
| 6,753,921 | B1 | 6/2004 | Shimizu |
| 6,810,481 | B1 | 10/2004 | Kawade et al. |
| 2002/0093583 | A1* | 7/2002 | Ito ............................ 348/373 |
| 2002/0154243 | A1* | 10/2002 | Fife et al. ................... 348/372 |
| 2004/0004671 | A1* | 1/2004 | Takahashi ................... 348/375 |
| 2004/0041933 | A1* | 3/2004 | Fredlund et al. ....... 348/333.01 |
| 2005/0174710 | A1* | 8/2005 | Masui et al. .................. 361/92 |

FOREIGN PATENT DOCUMENTS

| CN | 1257217 | 6/2000 |
| CN | 1404198 | 3/2003 |
| JP | 2001-075682 | 3/2001 |

OTHER PUBLICATIONS

Chinese Office Action dated Apr. 7, 2006 for Chinese Patent Applicaton EIF042870.
Universal Serial Bus Specification Revision 1.1, Chapters 4 and 7, Sep. 23, 1998.
Universal Serial Bus Specification Revision 2.0, Chapters 4 and 7, Apr. 27, 2000.

* cited by examiner

Primary Examiner—A. Elamin
(74) Attorney, Agent, or Firm—Morgan & Finnegan, LLP

(57) ABSTRACT

If supply of power from a main power source is insufficient but power being supplied from a communication interface (such as a USB interface) is sufficient, an image sensing apparatus (such as a digital video camera or digital camera) supplies power from the communication interface to a limited number of components. As a result, the image sensing apparatus is capable of functioning as a bus-powered device.

14 Claims, 8 Drawing Sheets

IMAGE SENSING APPARATUS AND POWER MANAGING METHOD

FIELD OF THE INVENTION

This invention relates to an image sensing apparatus (such as a digital video camera or digital camera) having a communication interface that is capable of feeding current, such as an interface compliant with the USB (Universal Serial Bus) standard (USB 1.1, USB 2.0, etc.) or one similar thereto, and to a method of managing power in such an image sensing apparatus.

BACKGROUND OF THE INVENTION

USB (Universal Serial Bus) standards (USB 1.1 (see "Universal Serial Bus Specification Revision 1.1, Sep. 23, 1998"), USB 2.0 (see "Universal Serial Bus Specification Revision 2.0, Apr. 27, 2000")) relate to communication interfaces between personal computers and peripherals. A communication interface that complies with the USB standard shall be referred to as a "USB interface" below.

A USB interface has a connector for D+ and D− lines, a VBUS line and a GND line. The D+ and D− lines are wires for data transfer, and the VBUS and GND lines are lines for supplying power. The VBUS line is limited to a current of 100 to 500 mA.

A bus-powered device and a self-powered device are stipulated by the USB standard. A bus-powered device is a device that operates on power supplied from a host or USB hub via a USB interface. A self-powered device is a device that operates on power supplied from its own main power source (an AC power source or battery).

For a description of prior art relating to USB power management, see the specification of Japanese Patent Application Laid-Open No. 2001-75682. This patent reference describes art whereby the power supplied to a device that exceeds the power supply capacity of a host is limited when the device is connected.

However, a conventional image sensing apparatus (such as a digital video camera or digital camera) consumes a large amount of power and cannot operate solely on power supplied from a USB interface. In other words, there is not a single conventional image sensing apparatus that can operate as a bus-powered device. This problem also arises with an image sensing apparatus having a communication interface compliant with a standard similar to the USB standard.

SUMMARY OF THE INVENTION

Accordingly, an object of the present invention is to provide an image sensing apparatus (such as a digital video camera or digital camera) that is capable of operating as a bus-powered device, as well as a method of managing power in this image sensing apparatus.

According to an aspect of the present invention, it is provided an image sensing apparatus comprising: a communication interface; a detecting unit adapted to whether there is supply of power from a main power source or from the communication interface; and a power managing unit adapted to limit power from the communication interface to prescribed components and supplying the power to these limited components in a case where power from the main power source is insufficient and power from the communication interface is sufficient.

According to another aspect of the present invention, it is provided a method of managing power in an image sensing apparatus having a communication interface, comprising steps of: detecting whether there is supply of power from a main power source or from the communication interface; and limiting power from the communication interface to prescribed components and supplying the power to these limited components in a case where power from the main power source is insufficient and power from the communication interface is sufficient.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
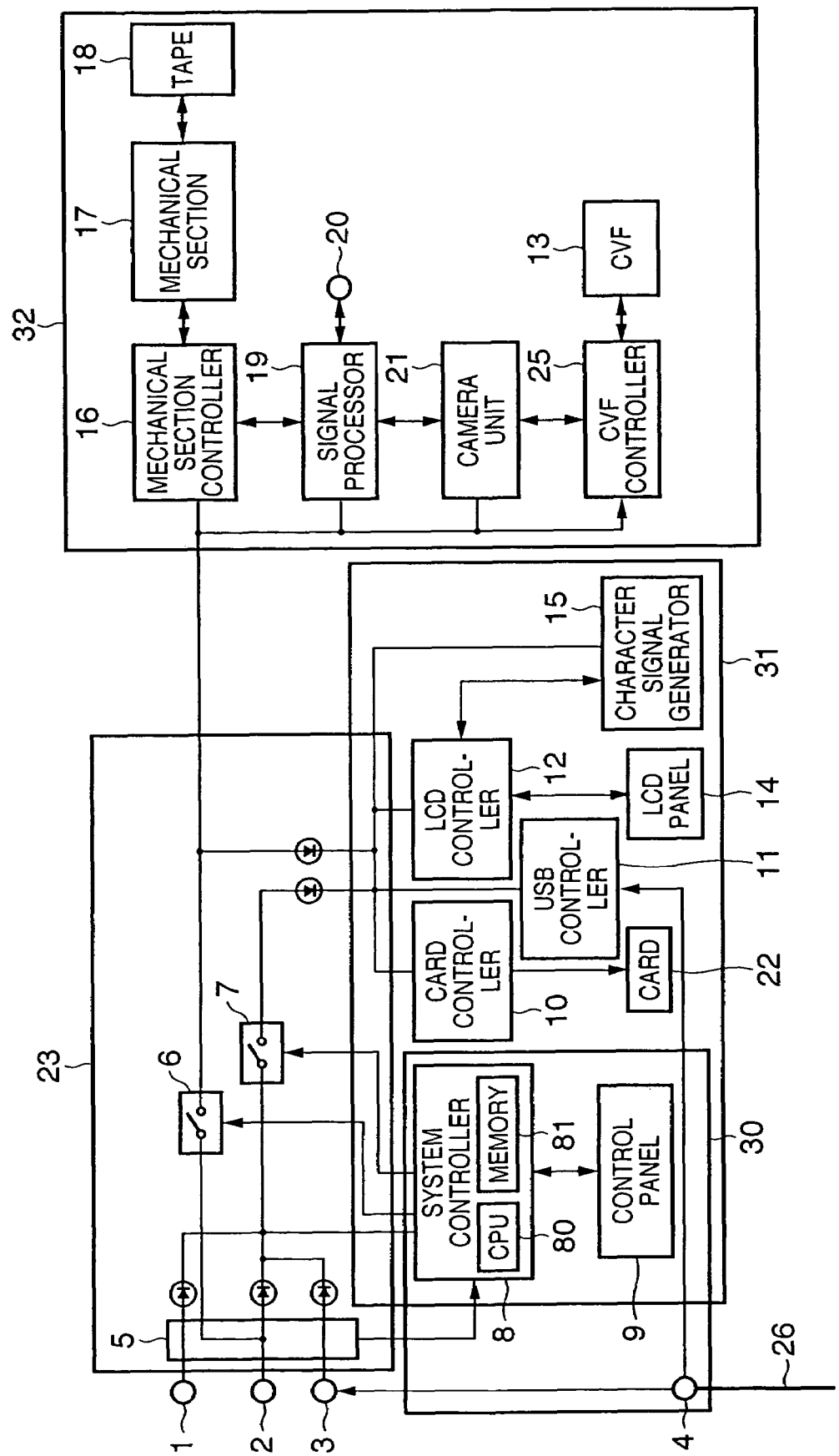
FIG. 1 is a block diagram illustrating the structure of a digital video camera according to a first embodiment of the present invention.

FIG. 1 is a block diagram illustrating the structure of a digital video camera 200 according to a first embodiment of the present invention.

As shown in FIG. 1, the digital video camera 200 has an input terminal 1 to which power is supplied from a back-up power source. The power applied to the terminal 1 is supplied to a system controller 8 at all times. An input terminal 2 receives power supplied from a main power source (an AC power source or a battery), and an input terminal 3 receives power (also referred to as "bus power") supplied from a USB interface 4. The latter is an interface compliant with the above-mentioned USB 1.1 and USB 2.0 standards or standards similar thereto and has a connector for D+ and D− lines, a VBUS line and a GND line. As stipulated by the USB standards, the D+ and D− lines are lines for data transfer, and the VBUS and GND lines are lines for supplying power.

A power-source detector 5 has a function for detecting whether power being supplied to the terminal 2 from the main power source (not shown) is sufficient or not, and a function for detecting whether power being supplied to the terminal 3 from the USB interface 4 is sufficient or not.

When closed, a changeover switch 6 adopts supply of power from the main power source as the power source of the digital video camera 200. When closed, a changeover switch 7 supplies power (bus power) from the terminal 3 to only to a card controller 10, USB controller 11, LCD (Liquid Crystal Display) controller 12, LCD panel 14 and character signal generator 15.

The system controller 8 executes overall control of the digital video camera 200 and includes a CPU 80 and a memory 81 storing a control program, etc., executed by the CPU 80. A control panel 9 has various switches and keys operated by the user. The LCD panel 14 also functions as part of the control panel 9.

The card controller 10 controls a removably inserted memory card 22. Specifically, the card controller 10 exercises control to record a video signal, which is generated by a camera unit 21, on the memory card 22, to reproduce the content of the memory card 22 and deliver the reproduced signal to a signal processor 19, whence the signal is processed and output to an AV terminal 20, to reproduce the content of the memory card 22 and deliver the reproduced signal to the LCD controller 12, whence the signal is output to the LCD panel 14, or to reproduce the content of the memory card 22 and deliver the reproduced signal to the USB controller 11, whence the signal is output to the USB interface 4.

The USB controller 11 controls the signal that enters from the USB interface 4. The LCD controller 12 outputs the following signals to the LCD panel 14: a character signal generated by character signal generator 15, a signal reproduced from the card controller 10, a signal, which is reproduced on tape 18, from the signal processor 19, and a sensed-image signal from the camera unit 21. A CVF (Color View Finder) 13, which is for being displayed on a finder having an ocular lens, comprises a display element such as an LCD and an optical system. The LCD panel 14, on the other hand, which is a so-called liquid crystal monitor, also functions as a finder although it provides display of larger size. A GUI screen such as a menu of various setup items also is displayed on the LCD panel 14, which therefore constructs part of the control panel 9. The character signal generator 15 generates a character signal and causes this signal to be displayed upon mixing it with the signal reproduced from the card controller 10, the signal reproduced on the tape 18 from the signal processor 19 and the sensed-image signal from the camera unit 21.

A mechanical section controller 16 controls a mechanical section 17 in order to record video on the recording tape 18, such as a video cassette tape, play back the video signal from the tape 18. The mechanical section 17 has a mechanism, and implements control thereof, for actually running the tape 18 and rotating heads to thereby record video on and play video back from the tape 18. The signal processor 19 outputs the following signals to the AV terminal 20: the character signal produced by the character signal generator 15, the reproduced signal from the card controller 10, the signal reproduced on the tape 18 from the mechanical section controller 16, and the sensed-image signal from the camera unit 21. The AV terminal 20 outputs the signal from the signal processor 19. The camera unit 21 generates a signal for executing photographic processing in the digital video camera 200. A power supply unit 23 controls the supply of power to the digital video camera 200 and supplies power to each of the components. A CVF controller 25 outputs the following signals to the CVF 13: the reproduced signal from the card controller 10, the signal reproduced on the tape from the signal processor 19, and the sensed-image signal from the camera unit 21. A USB cable 26 is for connecting the digital video camera 200 to a printer, personal computer or other device via the USB interface 4.

Also illustrated in FIG. 1 are a block 30 to which power is supplied by the back-up power source, a block 31 to which power is supplied when the switch 7 is closed, and a block 32 to which power is supplied when the switch 6 is closed. It should be noted that power is supplied to both blocks 31 and 32 when the switch 6 is closed, as a result of which the device can operate in the usual fashion as the digital video camera 200.

Figure 2:
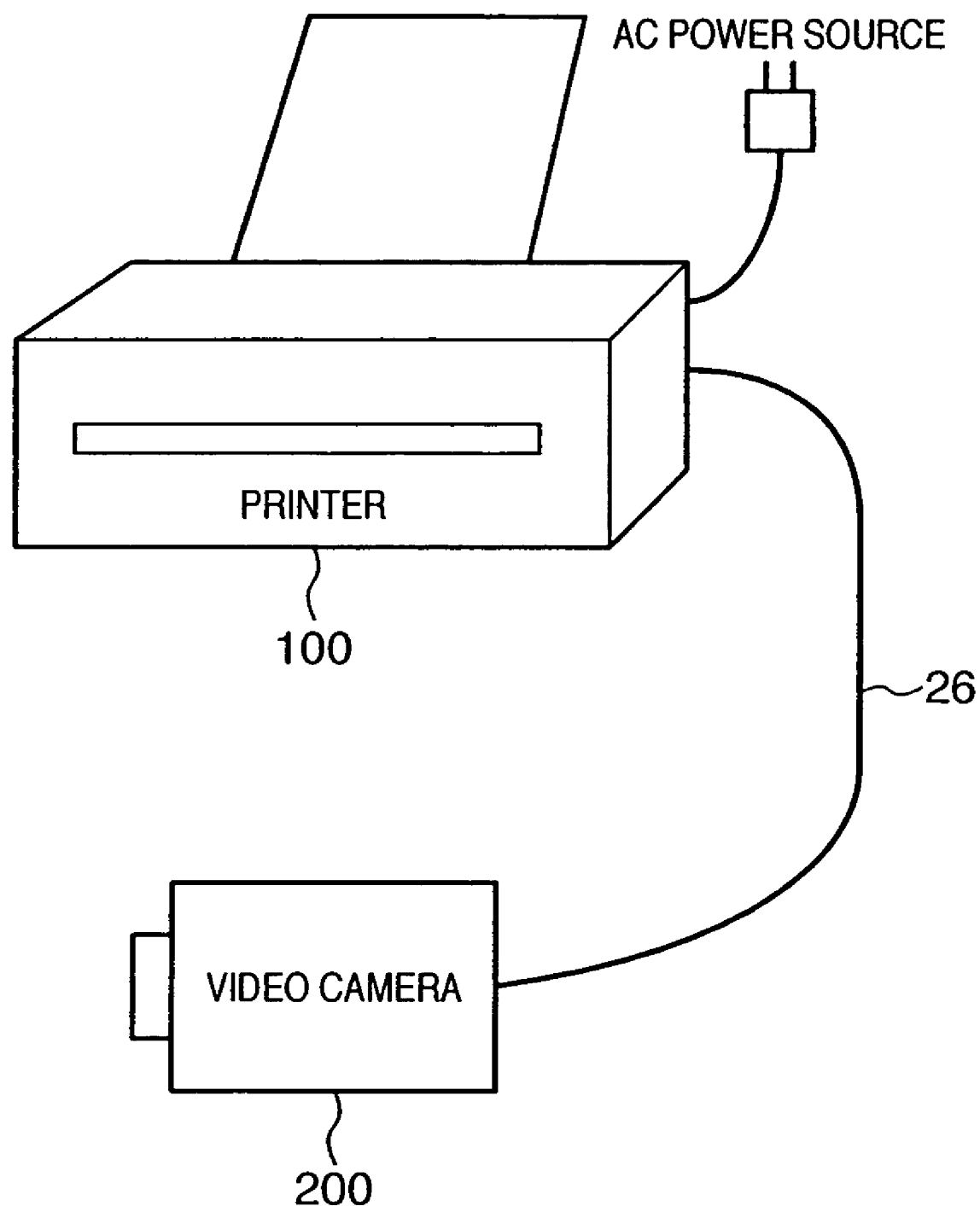
FIG. 2 is a diagram illustrating the digital video camera and a printer in a state connected by a USB according to the first embodiment.

FIG. 2 is a diagram useful in describing the configuration of a printing system (a direct-print system) for performing printing by a direct connection between the digital video camera 200 and printer 100 according to the first embodiment.

As illustrated in FIG. 2, the printer 100, which is connected to an AC power source, supplies bus power to the digital video camera 200 in a case where the digital video camera 200 and the printer 100 are connected via the USB cable 26. In other words, in this USB connection, the printer 100 serves as the "host" and the digital video camera 200 as the "device". In a system having such a configuration, image information that has been recorded on the memory card 22 is transmitted from the digital video camera 200 to the printer 100, which proceeds to print the image represented by the image information.

Figure 3:
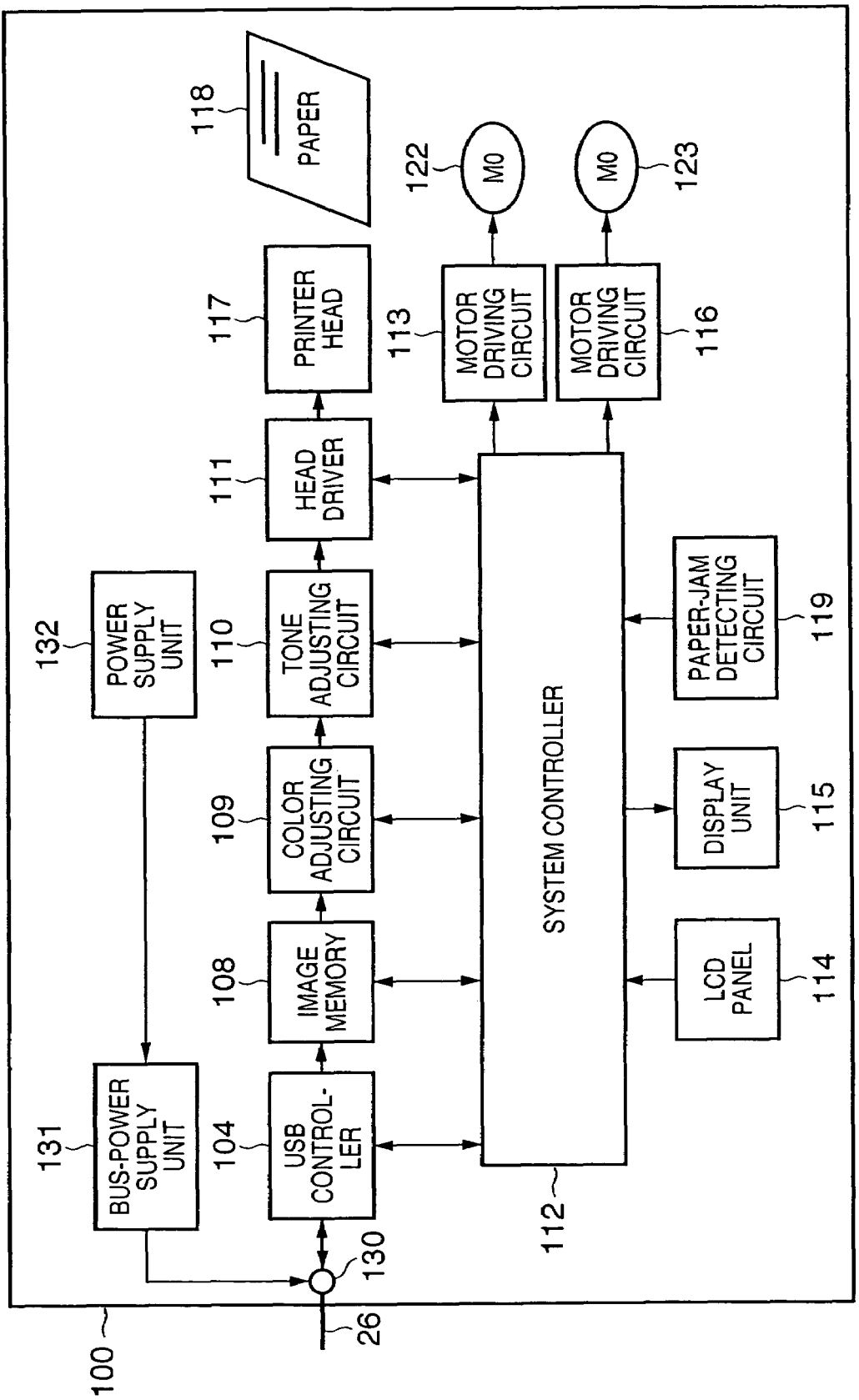
FIG. 3 is a block diagram illustrating the structure of a printer according to the first embodiment.

FIG. 3 is a block diagram illustrating the structure of the printer 100 according to the first embodiment.

A USB interface 130 is one that complies with the USB 1.1 and USB 2.0 standards or standards similar thereto. A USB controller 104 controls an exchange of signals via the USB in a manner similar to that of the USB controller 11 in the digital video camera 200 described above. An image memory 108 stores encoded image data that has entered from the digital video camera 200 or print images obtained by decompressing such image data.

A color adjusting circuit 109 adjusts the color of an image to be printed. A tone adjusting circuit 110 applies tone processing to the image to be printed. A head driver 111 drives a printer head 117 in accordance with image data that is output from the tone adjusting circuit 110. Printing paper 118 is a printing medium on which an image is printed. A system controller 112 controls the overall operation of the printer 100. A motor driving circuit 113 controls the drive of a carriage motor 122 for causing the printer head 117 to scan across the printing medium. A motor driving circuit 116 controls the drive of a sheet feeding motor 123 for feeding paper. A main switch 114 includes a power supply switch and keys or switches that allow the user to apply commands to the printer.

A display unit 115 displays information such as information relating to the printer 100. A paper-jam detecting circuit 119 detects jamming of paper based upon an output of a paper sensor or the like. A bus-power supply unit 131 supplies bus power to the USB interface 130. Bus power supplied from the USB interface 130 is input to the USB interface 4 through the USB cable 26 and is used by the digital video camera 200. A power supply unit 132 supplies power to the various blocks constituting the printer 100.

It should be noted that the printer head 117 may be one that uses an electromagnetic transducer such as a piezoelectric element as means for generating energy needed to discharge ink, or one that heats a liquid by an electrothermal transducer having a heating resistor. According to the first embodiment, however, the printer head 117 is of the ink-jet type that discharges a liquid by utilizing thermal energy (i.e., the film-boiling phenomenon).

Figure 4:
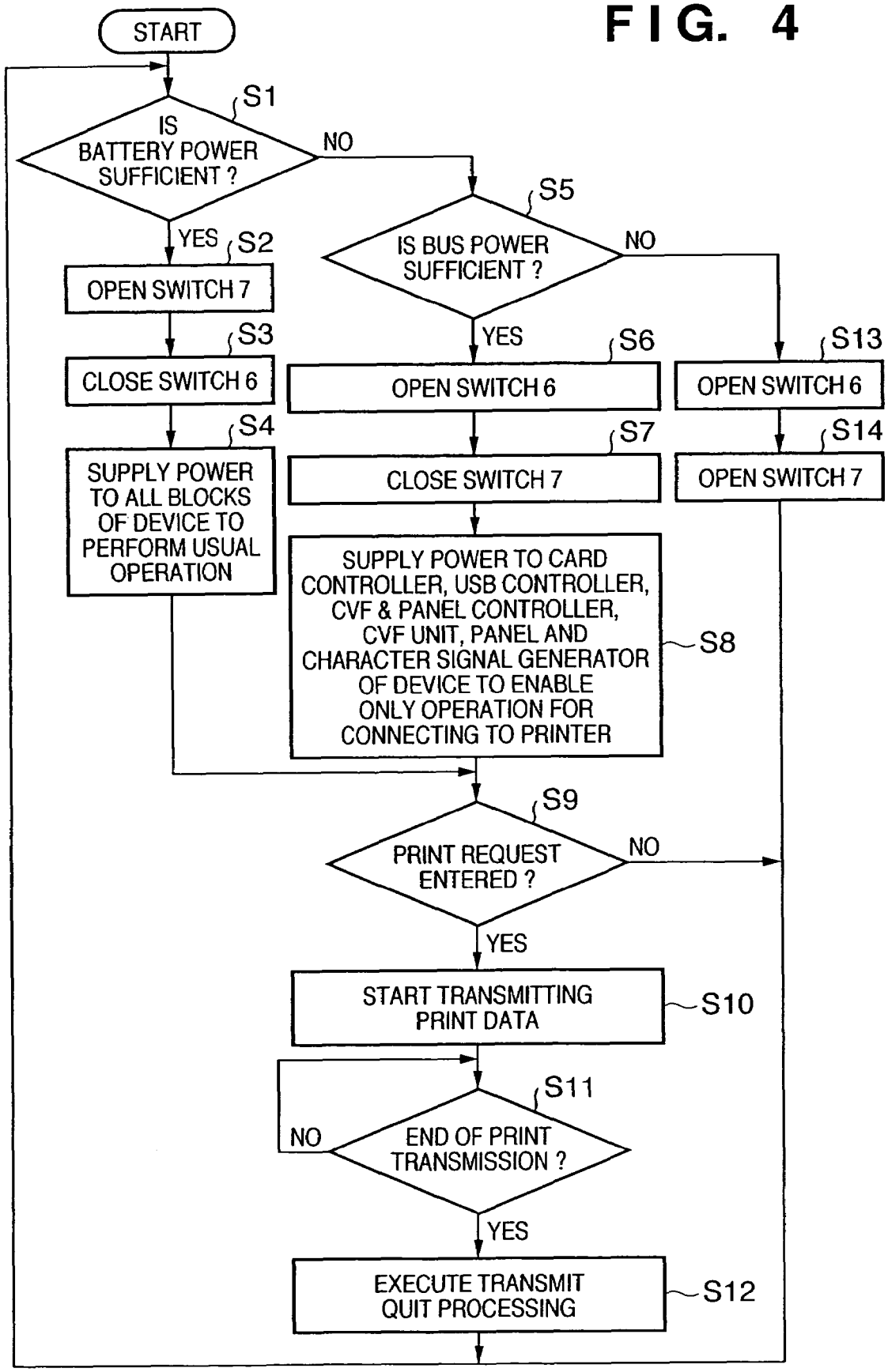
FIG. 4 is a flowchart illustrating the procedure of power management processing executed by the digital video camera according to the first embodiment.

FIG. 4 is a flowchart useful in describing the procedure of power management processing executed in the digital video camera 200 of the first embodiment. The program for executing the processing described in connection with FIG. 4 is stored in the memory 81 of the system controller 8 and is executed by the CPU 80 of system controller 8. It should be noted that the system controller 8 for executing this processing is run by back-up power supplied from the back-up power source.

First, at step S1 in FIG. 4, it is determined whether power being supplied from the main power source to the terminal 2 is sufficient or not using the result of detection by the power-source detector 5. If the power being supplied from the main power source to the terminal 2 is sufficient, control proceeds to step S2, where the switch 7 is opened, and then to step S3, where the switch S6 is closed. As a result, power from the main power source is supplied to the entire digital video camera 200 so that the camera can perform fully the usual operations of a digital video camera (step S4).

If power being supplied from the main power source to the terminal 2 is insufficient, the control proceeds to step S5. Here it is determined whether the power being supplied from the USB interface 4 to the terminal 3 is sufficient. If the power being supplied from the USB interface 4 to the terminal 3 is sufficient, then control proceeds to step S6, where the switch 6 is opened, and then to step S7, where the switch 7 is closed. As a result, the power supplied to the USB interface 4 is supplied to the system controller 8, control panel 9, card controller 10, USB controller 11, LCD controller 12, LCD panel 14 and character signal generator 15 via the switch 7 (step S8). Further, by opening switch 6, supply of power to the block 32 for controlling the camera unit 21 and the recording of images on the tape 18 is halted.

At step S8, the digital video camera 200 starts operating as a bus-powered device. At this time the digital video camera 200 supplies power only to components necessary for processing (print processing in this case) between itself and the USB host (the printer 100 in this case).

Figure 5:
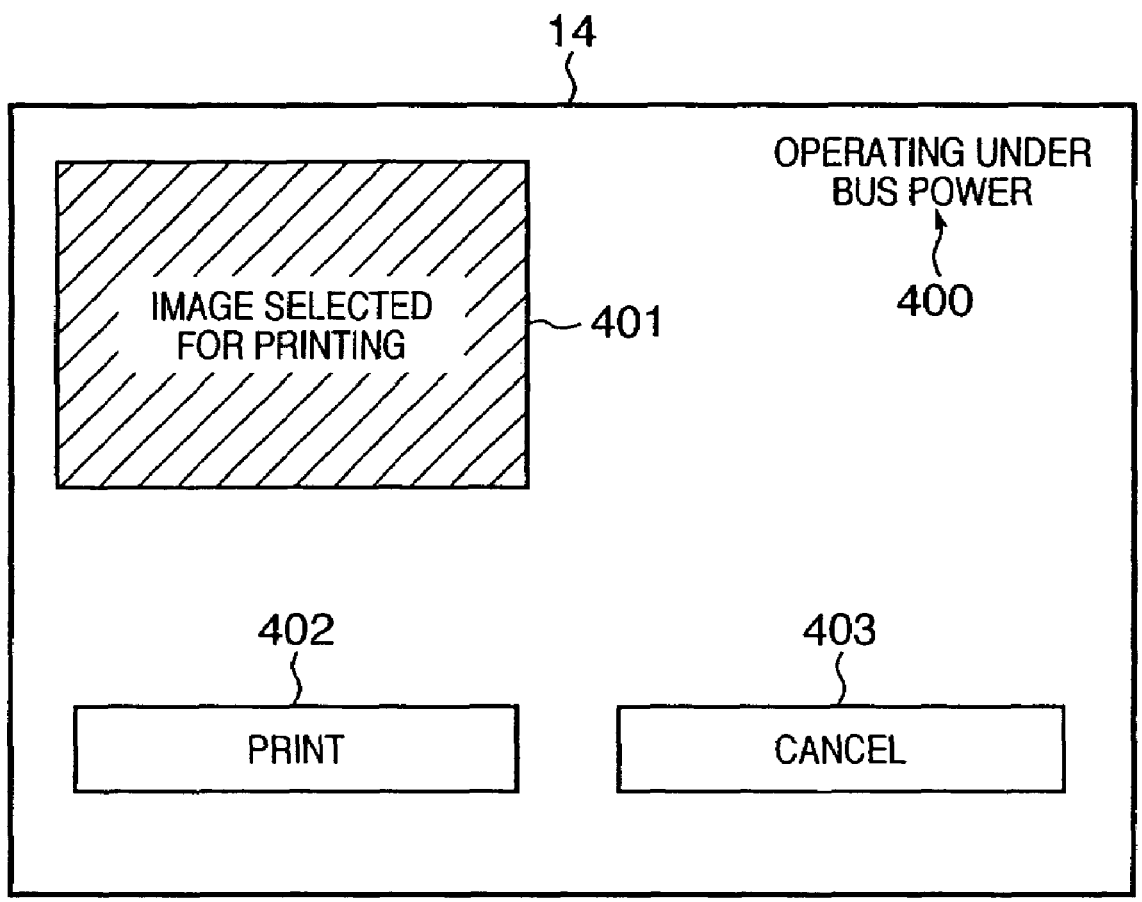
FIG. 5 is a diagram illustrating an example of a panel display whereby the user of the digital video camera is notified of the fact that camera is running on bus power.

FIG. 5 is a diagram illustrating an example of a screen displayed on the LCD panel 14 in a case where the device is being operated by supply of power from bus power.

In this case, an image (401) selected so as to be printed and buttons 402, 403 for designating printing and cancelling printing are displayed, and a message ("OPERATING UNDER BUS POWER") 400 indicating that the device is being operated as a bus-powered device is displayed. Thus, the system controller 8 prohibits the user of the digital video camera 200 from operating the control panel 9 to perform an operation other than printing or printing set-up and notifies the user of the fact that the operation of the digital video camera 200 is being restricted.

Next, control proceeds to step S9, where it is determined whether the control panel 9 has been used to select a print image and whether a print request has been entered by clicking the "PRINT" button 402 shown in FIG. 5. If a print request has been entered, then control proceeds to step S10, where the selected print data starts being transmitted to the printer 100. Accordingly, the card controller 10 is instructed to perform an operation for reading in image data that has been stored on the memory card 22, and the system controller 8 causes the USB controller 11 to put the image data from memory card 22, which has been read by the card controller 10, into the form of data that can be printed by the printer 100 and to transmit the data from the USB interface 4 to the printer 100. Next, when transmission of the print data ends at step S11, control proceeds to step S12, where the printer 100 is notified of the fact that transmission of all image data has ended. In response, print processing starts in the printer 100.

Further, if it is found at step S5 that power being supplied from the USB interface 4 to the terminal 3 is insufficient, control proceeds to step S13 and the switch 6 is opened. Next, control proceeds to step S14, where switch 7 is closed. As a result, supply of power to the digital video camera 200 is terminated.

It should be noted that the printer 100 that has received image data from the digital video camera 200 forms a print image using the system controller 112, stores the image in the image memory 108, controls the color adjusting circuit 109 that adjusts printing control, the tone adjusting circuit 110 that executes print tone processing, the head driver 111 that causes the printer head 117 to print the output image from the tone adjusting circuit 110, the motor driving circuit 113 that moves the printer head 117 and the motor driving circuit 116 that drives the paper-feed motor, whereby the specified image is printed on the printing paper 118.

With the digital video camera 200 according to the first embodiment as described above, power can be supplied only to limited blocks in a case where power from the main power source is insufficient but power from the USB interface 4 is sufficient. As a result, even in the absence of a main power source for the digital video camera 200, an image recorded on a memory card that has been inserted into the digital video camera 200 can be output to a printer and printed.

Second Embodiment

Figure 6:
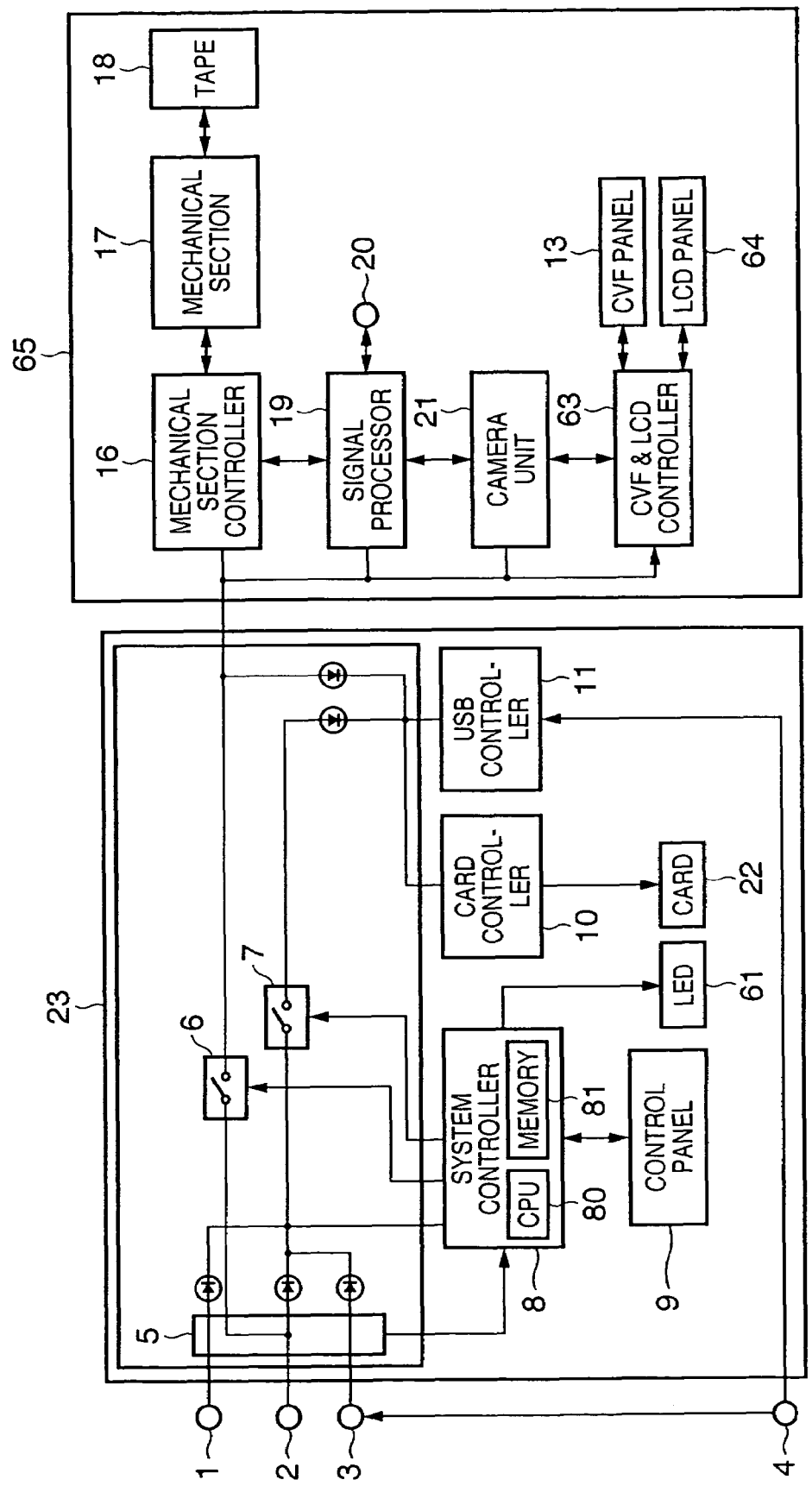
FIG. 6 is a block diagram illustrating the structure of a digital video camera according to a second embodiment of the present invention.

FIG. 6 is a block diagram illustrating the structure of a digital video camera 200 according to a second embodiment of the present invention. Components in FIG. 7 identical with those in FIG. 1 are designated by like reference characters and need not be described again.

In FIG. 6, the power-source detector 5 has a function for detecting whether power being supplied to the terminal 2 from the main power source is sufficient or not, and a function for detecting whether power being supplied to the terminal 3 from the USB interface 4 is sufficient or not. When closed, the changeover switch 7 supplies bus power from the terminal 3 to the card controller 10 and USB controller 11. An LED 61 lights in order to indicate to the user the fact that the digital video camera 200 is running solely on bus power. A CVF & LCD controller 63 outputs the signal reproduced by the card controller 10, the reproduced signal on tape 18 from the mechanical section controller 16 and the sensed-image signal from the camera unit 21 to an LCD panel 64.

Also illustrated in FIG. 6 are a block 62 to which power is supplied by bus power from the USB connection or from the main power source, and a block 65 driven by power from the main power source.

Figure 7:
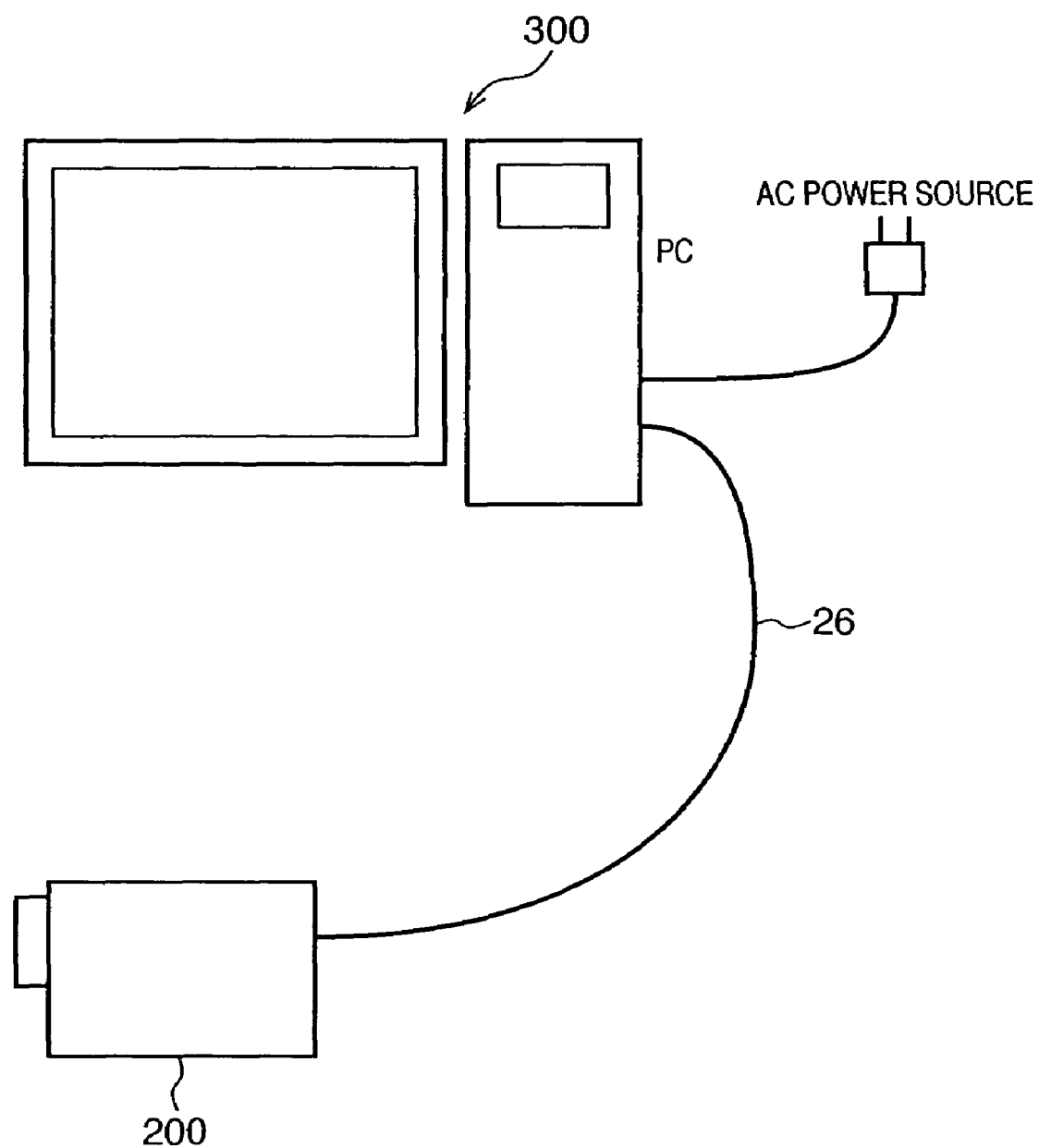
FIG. 7 is a diagram illustrating the digital video camera and a personal computer in a state connected by a USB according to the second embodiment.

If the digital video camera 200 having the structure described above and a personal computer 300 are connected via a USB cable in the manner shown in FIG. 7, the personal computer 300 serves as the host and is the side that supplied bus power. The digital video camera 200 is the device and is the side that receives bus power. With the connections as described, image data can be read from and written to the memory card 22 of the digital video camera 200 in response to commands from the personal computer 300.

Figure 8:
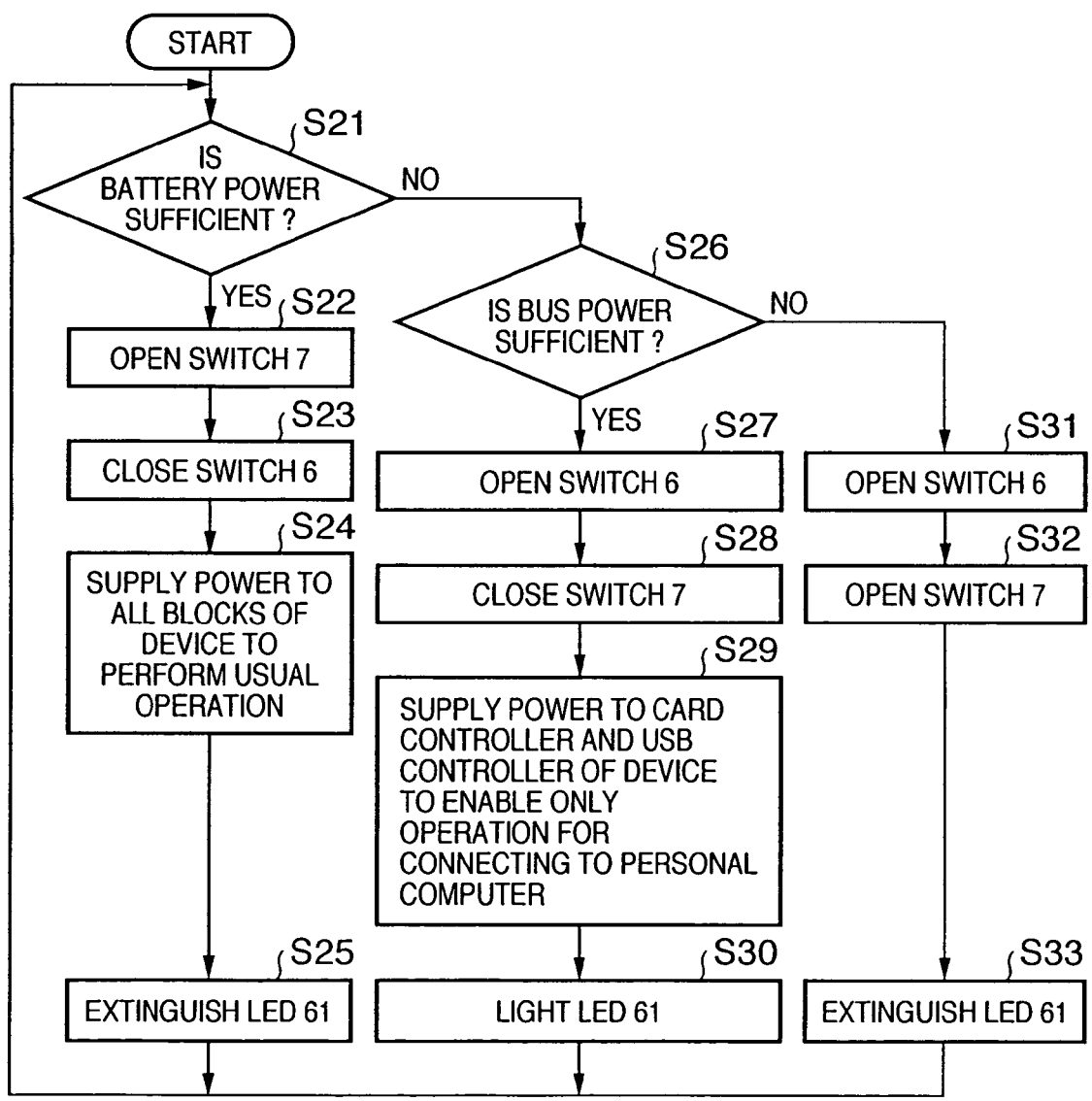
FIG. 8 is a flowchart illustrating the procedure of power management processing executed by the digital video camera according to the second embodiment.

FIG. 8 is a flowchart useful in describing the procedure of power management processing executed in the digital video camera 200 of the first embodiment. The program for executing the processing described in connection with FIG. 8 is stored in the memory 81 of the system controller 8 and is executed by the CPU 80 of system controller 8.

First, at step S21 in FIG. 8, it is determined whether power being supplied from the main power source to the terminal 2 is sufficient or not in a manner similar to that of step 1 in FIG. 4. If the power being supplied from the main power source to the terminal 2 is sufficient, control proceeds to step S22, where the switch 7 is opened, to step S23, where the switch S6 is closed, and then to step S24, where power from the main power source is supplied to all blocks of the digital video camera 200 so that the digital video camera 200 can operate without any limitation being imposed upon its functions. Control then proceeds to step S25, where the LED 61 is extinguished to notify the user of the fact that the digital video camera 200 is not operating as a bus-powered device.

If power being supplied from the main power source to the terminal 2 is insufficient, the control proceeds to step S26. Here it is determined whether the power being supplied from the USB interface 4 to the terminal 3 is sufficient, just as step S5 in FIG. 4. If the power being supplied from the USB interface 4 to the terminal 3 is sufficient, then control proceeds to step S27, where the switch 6 is opened to cut off the supply of power to block 65, and then to step S7, where the switch 7 is closed. As a result, the power from bus power is supplied only to the system controller 8, control panel 9, card controller 10 and USB controller 11 (block 62) of the digital video camera 200, so that the power consumed by the entire digital video camera 200 is reduced (step S29). At step S29, the digital video camera 200 starts operating as a bus-powered device. At this time the digital video camera 200 supplies power only to components necessary for processing (image transfer processing in this case) between itself and the USB host (the personal computer 300 in this case). Control then proceeds to step S30, where the LED 61 is lit to notify the user of the fact that the digital video camera 200 is operating as a bus-powered device.

In this state also, just as in the case of normal operation at step S24, the system controller 8 instructs the card controller 10 to control the writing and reading of the memory card 22 upon receiving a command, which is for reading/writing image data from/to the memory card 22, from the personal computer 300 via the USB interface 4 and USB controller 11. The data read from the memory card 22 by the card controller 10 is converted to data that can be transmitted to the personal computer 300, and the data can be output from the USB interface 4 via the USB controller 11.

Further, upon receiving a command from the personal computer 300 via the USB interface 4 and the USB controller 11 to write image data to the memory card 22, the system controller 8 accepts the image data, which is sent from the personal computer 300, by the USB controller 11, converts this data to data that is writable to the memory card 22 and can write the data to the memory card 22 under the control of the card controller 10.

If the power supplied from the USB interface 4 to the terminal base station 3 is insufficient, control proceeds from step S26 to step S31, where switch 6 is opened, and then to step S32, where switch 7 is opened. As a result, supply of power to the digital video camera 200 is terminated. Control then proceeds to step S33, at which the LED is extinguished to notify the user of the fact that the digital video camera 200 is not operating as a bus-powered device.

In accordance with the second embodiment, as described above, power is supplied only to limited blocks in a case where power from the main power source is insufficient but power from the USB interface 4 is sufficient. As a result, even in the absence of a main power source, the personal computer can access image data on the memory card that has been inserted into the digital video camera 200.

Further, the second embodiment is such that when supply of power is by bus power, operation that is not particularly required, such as the operation of image and display blocks, is limited (that is, the blocks are turned off) between the image sensing apparatus proper and an external device connected to it, thereby making it possible implement operation within the specifications of bus power that the USB is capable of supplying. Even if a main power source or the like is not installed in the image sensing apparatus proper, direct-print and card reader operations can be executed with ease.

Further, when the image sensing apparatus per se is operating under bus power, the indicator (LED) with which the device proper is provided can readily make the user aware of a state in which the image sensing function of the device itself and the image display function have been turned off (or limited).

Other Embodiments

As described above, the object of the invention is attained also by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes. In this case, the program codes per se read from the storage medium implement the novel functions of the embodiment and the storage medium storing the program codes constitutes the invention. Examples of storage media that can be used for supplying the program code are a floppy disk, hard disk, optical disk, magneto-optical disk, CD-ROM, CD-R, magnetic tape, non-volatile type memory card or ROM, etc.

Further, besides the case where the aforesaid functions according to the embodiments are implemented by executing the program codes read by a computer, the present invention covers a case where an operating system or the like running on the computer performs a part of or the entire process in accordance with the designation of program codes and implements the functions according to the embodiments.

Furthermore, the present invention covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the functions of the above embodiments.

In the illustrated embodiments, a case where the image sensing apparatus is the digital video camera 200 is described. However, the present invention is not limited to this and can also be applied to various mobile devices such as a digital camera, a cellular telephone or a PDA.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-303544, filed on Aug. 27, 2003, which is hereby incorporated by reference herein.

What is claimed is:

1. An image sensing apparatus comprising:
   a communication interface which is used to communicate with an external device;
   a first power detecting unit which detects whether power from a main power source of said image sensing apparatus is sufficient;
   a second power detecting unit which detects whether power from said communication interface is sufficient; and
   a power managing unit which continues supply of power from said communication interface to a first component of said image sensing apparatus but limits supply of power from said communication interface to a second component of said image sensing apparatus, if power from the main power source is insufficient but power from said communication interface is sufficient.

2. The image sensing apparatus according to claim 1, wherein said communication interface is compliant with one of USB 1.1, USB 2.0 and a standard similar thereto.

3. The image sensing apparatus according to claim 1, further comprising:
   a notifying unit which notifies a user that power from the main power source is insufficient but power from the communication interface is sufficient.

4. The image sensing apparatus according to claim 1, wherein the second component includes a camera unit but the first component does not include the camera unit.

5. The image sensing apparatus according to claim 1, wherein the first component includes a control unit which controls transfer of image data between the external device and the image sensing apparatus but the second component does not include the control unit.

6. The image sensing apparatus according to claim 1, wherein the main power source is one of an AC power source and a battery.

7. A method of managing power in an image sensing apparatus, the image sensing apparatus having a communication interface which is used to communicate with an external device, comprising the steps of:
   detecting whether power from a main power source of the image sensing apparatus is sufficient;
   detecting whether power from the communication interface is sufficient; and
   continuing supply of power from the communication interface to a first component of the image sensing apparatus but limiting supply of power from the communication interface to a second component of the image sensing apparatus, if power from the main power source is insufficient but power from the communication interface is sufficient.

8. The method according to claim 7, wherein the communication interface is compliant with one of USB 1.1, USB 2.0 and a standard similar thereto.

9. The method according to claim 7, further comprising the step of:
   notifying a user that power from the main power source is insufficient but power from the communication interface is sufficient.

10. The method according to claim 7, wherein the second component includes a camera unit but the first component does not include the camera unit.

11. The method according to claim 7, wherein the first component includes a control unit which controls transfer of image data between the external device and the image sensing apparatus but the second component does not include the control unit.

12. The method according to claim 7, wherein the main power source is one of an AC power source and a battery.

13. The image sensing apparatus according to claim 1, wherein the external device is one of a printer and a personal computer.

14. The method according to claim 7, wherein the external device is one of a printer and a personal computer.

* * * * *